July 13, 1937.  N. G. A. MALMQUIST  2,086,720
RESILIENT CONNECTION
Filed Nov. 28, 1934   2 Sheets-Sheet 1
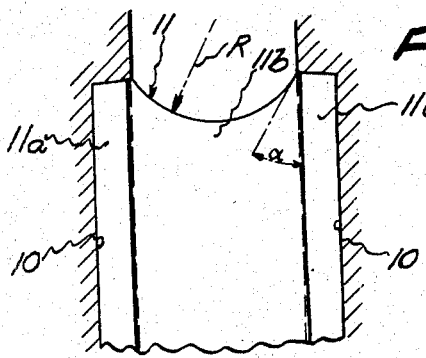
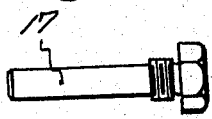
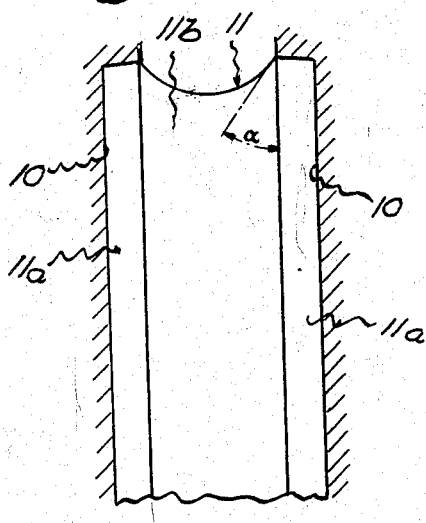
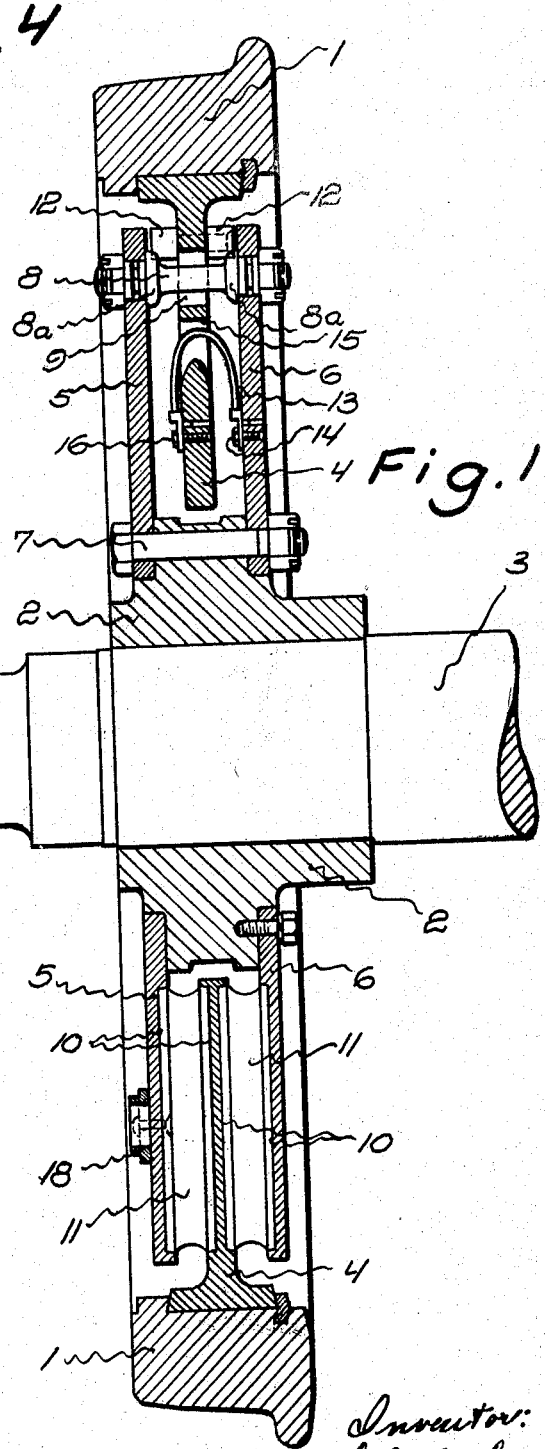
Inventor:
N. G. A. Malmquist
By C. F. Wandroth
Atty July 13, 1937.  N. G. A. MALMQUIST  2,086,720
RESILIENT CONNECTION
Filed Nov. 28, 1934  2 Sheets-Sheet 2

Patented July 13, 1937

UNITED STATES PATENT OFFICE 2,086,720

RESILIENT CONNECTION

Nils Gunnar August Malmquist, Malmo, Sweden, assignor to Svenska Aktiebolaget Bromsregulator, Malmo, Sweden, a corporation of Sweden Application November 28, 1934, Serial No. 755,195

9 Claims. (Cl. 295—11)

This invention relates to resilient connections of the kind comprising a number of flexible blocks of vulcanized rubber or equivalent material forming transverse supporting elements between relatively movable parts disposed in substantially parallel planes. More particularly the invention relates to resilient connections of this character, in which each of said blocks has relatively short end portions fitting normally coaxial recesses in the facing sides of the relatively movable parts and a relatively extended intermediate portion, and in which each of said blocks is disposed under axial compression between the relatively movable parts. As shown by way of example, said connections are between axially spaced overlapping flanges on the hub and rim member of a wheel, for instance a street or railway car wheel, for cushioning the rim against the hub of the wheel. I wish it to be understood, however, that the invention is not limited to such use, since the invention may be used also for other practical purposes such as, for example, resiliently suspending the body, or the engine, of a car in its base frame.

The invention has for its main object to preserve the life of the rubber blocks and to ensure an improved cushioning effect thereof. Another object of the invention, especially when used for cushioning the rim of a wheel against the hub thereof, is to facilitate assembling and dismantling of the wheel for inspection and renewal of the rubber blocks, and generally to provide a resilient wheel which is relatively easy and inexpensive to keep in repair.

Figure 2:
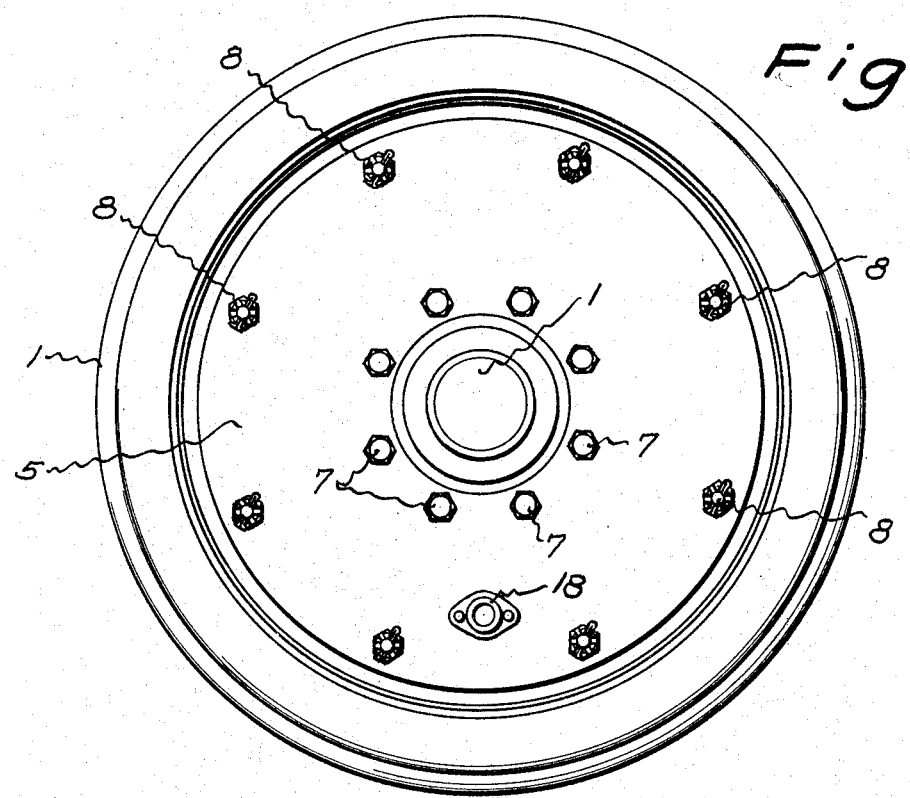
Figure 3:
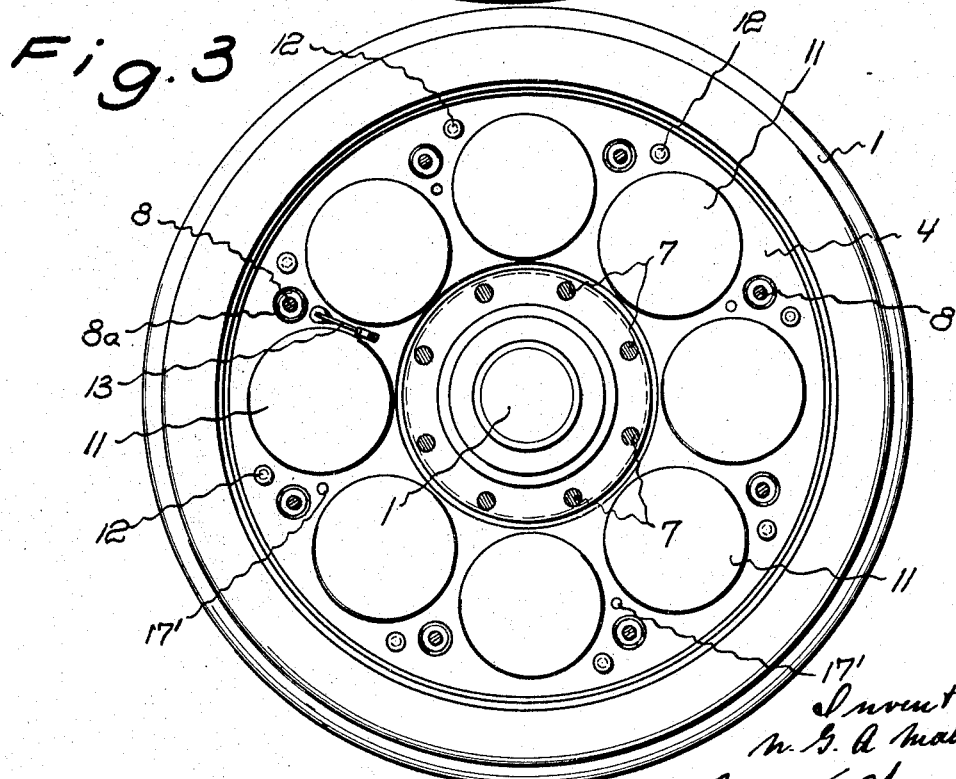

For a full understanding of the invention, and the advantages gained thereby, reference is to be had to the accompanying drawings in which Fig. 1 is a sectional view of a car wheel according to a preferred embodiment of the invention, the section being substantially on line I—I of Fig. 3. Fig. 2 is a side elevation of the wheel. Fig. 3 is a similar side elevation of the wheel, wherein the outer flange on the inner wheel body is removed and the attaching bolts are shown in section. Figs. 4 and 5 are fragmental views on a larger scale of one of the rubber blocks in free and axially compressed state respectively, the adjacent portions of the relatively movable parts having the recesses receiving the end portions of the block being shown in section. Fig. 6 illustrates in detail an arresting bolt.

In the drawings 1 indicates the rim and 2 the inner body or hub of the wheel which in Fig. 1 is shown to be secured to an axle 3 so as to turn therewith. The rim 1 is provided with, or seated on, an annular radial flange 4, and on opposite sides of the said flange 4 and axially spaced therefrom there are two annular radial flanges 5 and 6 carried on the hub 2. Preferably both the flanges 5 and 6 on the hub 2 are detachably secured thereto by means of attaching bolts 7 as shown, although one of said flanges might be integral with the hub 2, if desired. The flanges 5 and 6 are also attached to each other near their outer edges by means of bolts 8 provided with collars 8a abutting the inner sides of the flanges, whereby the bolts 8 at the same time serve as distance pieces or spacers between the flanges 5 and 6. The flange 4 is provided with holes 9 for the bolts 8, the holes 9 being of such a diameter as to allow for relative movement of the rim and hub of the wheel in all radial directions.

A series of recesses 10 is formed in each side of the flange 4 and in the facing sides of the flanges 5 and 6, and a series of flexible rubber blocks 11, preferably of circular cross section, is disposed between each of the flanges 5 and 6 and the intermediate flange 4, each block 11 having one end seated in a recess 10 in the flange 4 and the other end in a normally coaxial recess 10 in the other flange 5 or 6 respectively so that the undeflected axes of the blocks 11 are parallel to the axes of the rim and the hub of the wheel. The rubber blocks 11 form the sole supporting medium between the hub and rim portions of the wheel for supporting the hub portion in such a way as to give freedom of the rim portion to move relatively to the hub portion in the plane of the wheel, while lateral displacement is limited by stops, for instance such as shown at 12, leaving but a relatively small clearance in the axial direction between the flanges 5 and 6 on the hub and the flange 4 on the rim of the wheel. In the assembled wheel the blocks 11 are under an axial compression which is of such an order as to prevent the rubber blocks from being subjected to any tension strain under the action of the load for which the wheel is constructed. The compression also serves the purpose of fastening the ends of the blocks in their seats in the sides of the flanges 4, 5 and 6 so as to prevent rubbing or frictional motion of the rubber blocks against the walls of their seats under the shearing and bending stresses to which the blocks are subjected when the wheel is under load. To this end the blocks 11 in their free or uncompressed state shown in Fig. 4 are of such a length that, when the wheel is assembled, they are compressed in the axial direction to such a degree that the axial pressure on each block exceeds, preferably by three times or more, the stress acting in the plane of the wheel, which the block has to transfer between the rim and the hub of the wheel when the wheel is under the full load for which it is designed. If, for instance, the wheel is designed for a load of 5000 kg. and has 20 blocks, each block should be under an axial compression of say 750 kg. Obviously this axial compression of the blocks 11 is obtained by tightening the bolts 7 and 8, when assembling the wheel, until the outer flanges or side disks 5 and 6 of the wheel are in place on the predetermined axial distance from each other.

The blocks 11 have relatively short end portions 11a fitting the recesses 10 and a relatively extended intermediate portion 11b diminishing in cross section from both ends towards the middle of the block. Preferably the generatrix of the intermediate portion 11b of the block, in the free or uncompressed state thereof shown in Fig. 4 has a radius R which is less than the axial length of the intermediate portion 11b of the block and greater, preferably but slightly greater than half the said axial length. The recesses 10 have a shape corresponding to the shape of the end portions 11a of the block, which preferably have a slight taper towards their free ends. In the free or uncompressed state of the blocks the end portions 11a have a relatively loose fit in the recesses 10, and when compressed as above described the blocks, including the end portions 11a thereof, are radially expanded, and through this expansion the said end portions 11a are pressed firmly against the walls of the recesses 10 so that the end portions 11a of the blocks, when the wheel is assembled, are firmly and securely fastened in the recesses 10 solely by means of the said radial expansion of the blocks. Due to this fastening of the rubber blocks and due to the form given to them as hereinbefore described and shown on the drawings, rubbing or frictional motion of the rubber blocks against the metal flanges 4, 5 and 6, or of one portion of the rubber block against another portion thereof, in the use of the wheel is prevented as far as possible, whereby the life of the rubber, which otherwise is soon worn out through such rubbing or friction, is preserved.

Rubber is a material capable of withstanding high compressive forces but liable to get damaged by tension strains and friction, and the invention is especially designed with a view to preserve, as far as possible, all the rubber in the resilient rubber block from such tension strains and friction as would result in the rubber block soon being damaged or worn out. While axial compression of the block may be considered, per se, as an obvious and known precaution against the rubber block being subjected to excessive tension strains when the block is deflected under the shearing and bending stresses to which it is subjected in use, I have discovered that, in order to obtain long life of the rubber block, it is essential not only to make use of axial compression of the block but to make use of an axial compression of such a high order as hereinbefore described and at the same time to give the block such a shape in its free or uncompressed state that the generatrix of the intermediate portion of the block, the surface of which is free to undergo elastic changes of shape, is concave not only in the free or uncompressed state of the block but also in the axially compressed state and under all normal working conditions of the block. Referring to Figs. 4 and 5 on the drawings, illustrating the block 11 in its free or uncompressed and axially compressed state, respectively, it is to be noted that, due to the concave shape of the generatrix of the intermediate portion 11b of the block, the length of this generatrix is substantially shortened by the axial compression of the block. This substantial shortening of the generatrix of the intermediate portion of the block by the axial compression thereof compensates, in part at least, the increase of the circumferential or net surface of the intermediate portion of the block, which is caused by the increase of the circumference of the said surface due to the radial expansion of the block, which is caused by the axial compression thereof. I have found that in this way all parts of said surface are effectively preserved from being tensioned or stretched through the axial compression of the block, and due to the fact that the generatrix of the intermediate portion of the block, as a result of the shape of the block and the high axial compression thereof, is so much shorter in the compressed state of the block than in the uncompressed state of the block that any lengthening of the generatrix due to deflection of the block under normal working conditions will be insufficient for restoring the length of the generatrix to its value in the uncompressed or free state of the block, all parts of the surface of the intermediate portion of the block are effectively preserved from being tensioned or stretched also under the action of such deflection of the block. Further, due to the fact that the generatrix of the intermediate portion 11b of the block at each end thereof meets the plane of the inner edge of the end portion 9a of the block under an angle α (Figs. 4 and 5) which is acute not only in the uncompressed state of the block but also in the axially compressed state of the block and under all normal working conditions of the block, the surface of the intermediate portion of the rubber block is preserved from creasing and cracking adjacent the inner edges of the end portions 11a of the block.

When the wheel is to be used under such conditions as require an electric connection between the hub and rim of the wheel, one or more electric conductors 13 are provided between the intermediate flange 4 and the flange 6. In order to facilitate assembling and disjoining of the wheel this conductor 13 has one of its ends attached to the inner side of the flange 6 by means of a screw 14 or the like and passes through an aperture 15 in the flange 4 and is attached to the side thereof facing the flange 5 by means of a screw 16 or the like. Arranged in this way the conductor or cable 13 will be subjected to the smallest possible deflection under the action of centrifugal force and the relative movements between the hub and rim of the wheel.

The wheel is assembled in the following manner. The flange 6 is secured to the hub 2 by means of a number of screws 17 and placed in a horizontal position with the side having the recesses 10 turned upwards. Then the rubber blocks 11 of one of the series thereof are placed loosely in the recesses 10 in the flange 6, and one end of the cable 13 is secured by means of the screw 14. Then the flange 4 carrying the rim 1 is placed on the said series of rubber blocks so that the upper ends thereof enter the recesses 10 in the lower side of the flange 4, and the cable 13 is passed through the aperture 15, the other end of the cable being secured to the upper side of the flange 4 by means of the screw 16. The bolts 8 having been attached to the flange 6, or to the flange 5, and the rubber blocks 11 of the other series of such blocks having been placed loosely in the recesses 10 in the upper side of the flange 4, now the flange 5 is placed on the last mentioned rubber blocks so that the upper ends thereof enter the recesses in the flange 5, whereafter also the bolts 7 are applied, and the nuts of all the bolts 7 and 8 are tightened. Disjoining of the wheel is performed in the reverse manner.

When re-turning of the tread surface of the rim 1 becomes necessary this can be done without dismantling the wheel, but in order to prevent yielding of the rim in relation to the hub under the turning operation the flanges 4, 5 and 6 are arrested in relation to each other by means of arresting screws 17, Fig. 6, for which screws threaded holes are provided, for instance, in the flange 6, the flange 4 being provided with holes for the said screws and the flange 5 being provided with recesses for the ends of the screws, as is clearly shown in Fig. 1. After turning of the rim 1 the screws 17 are removed, and the screw threaded holes for them in the flange 6 are closed with short screw plugs. Secured to the outer side of the flange 5 is a collar 18 or the like with which the work piece driver of the lathe may be engaged in the turning operation.

From the above description, taken in connection with the drawings, it will be apparent that I have provided a construction by which disjoining and assembling of the resilient connection for inspection and for renewal of the rubber blocks can be performed in a relatively simple manner, while the rubber blocks in the assembled construction due to the high axial compression and to the manner of fastening them, and also due to the shape given to them, are preserved from being subjected to any tension strain and from being subjected to detrimental rubbing or friction although the intermediate portion of the rubber blocks, extending between the firmly and securely fastened end portions of the rubber blocks, have freedom of bending in an elastic manner in all radial directions.

What I claim and desire to secure by Letters Patent is:—

1. A resilient wheel having a hub member and a rim member, overlapping flanges on said members axially spaced from one another and having a plurality of normally coaxial substantially shallow recesses in their facing sides, flexible rubber blocks disposed between said flanges and in said recesses, means to exert an axial compression on said blocks greater than the shearing stress when the wheel is under the full load for which it was designed to thereby maintain said blocks in said shallow recesses and forming the sole means to hold said parts assembled and the periphery of said blocks having a circumferential concave surface therein of sufficient depth so that under all conditions of compression and load for which the wheel was designed said surface will retain its concave contour.

2. A resilient wheel having a hub member and a rim member, two outer radial flanges on one of said members, an intermediate radial flange on the other of said members, said flanges overlapping each other and being axially spaced from one another and having a plurality of normally coaxial substantially shallow recesses in their facing sides, flexible rubber blocks disposed in said recesses and between said intermediate flange and each of said outer flanges, means to exert an axial compression on said blocks greater than the shearing stress when the wheel is under the full load for which it was designed to thereby maintain said blocks in said shallow recesses and forming the sole means to hold said parts assembled and the periphery of said blocks having a circumferential concave surface therein of sufficient depth so that under all conditions of compression and load for which the wheel was designed said surface will retain its concave contour.

3. A resilient wheel having a hub member and a rim member, overlapping flanges on said members axially spaced from one another and having a plurality of normally coaxial substantially shallow recesses in their facing sides, flexible rubber blocks disposed between said flanges and in said recesses, means to exert an axial compression on said blocks greater than the shearing stress when the wheel is under the full load for which it was designed to thereby maintain said blocks in said shallow recesses and forming the sole means to hold said parts assembled, the periphery of said blocks having a circumferential concave surface therein of sufficient depth so that under all conditions of compression and load for which the wheel was designed said surface will retain its concave contour and said blocks having relatively short end portions seating loosely in said recesses in the uncompressed state of the blocks and being firmly fixed therein by radial expansion when said blocks are axially compressed in assembling the wheel.

4. A resilient wheel having a hub member and a rim member, overlapping flanges on said members axially spaced from one another and having a plurality of normally coaxial substantially shallow recesses in their facing sides, flexible rubber blocks disposed between said flanges and in said recesses, means to exert an axial compression on said blocks greater than the shearing stress when the wheel is under the full load for which it was designed to thereby maintain said blocks in said shallow recesses and forming the sole means to hold said parts assembled, the periphery of said blocks having a circumferential concave surface therein of sufficient depth so that under all conditions of compression and load for which the wheel was designed said surface will retain its concave contour, and said concave surface having a cross sectional transverse radius less than the width of said surface and greater than one half said width.

5. A resilient wheel having a hub member and a rim member, overlapping flanges on said members axially spaced from one another and having a plurality of normally coaxial substantially shallow recesses in their facing sides, flexible rubber blocks disposed between said flanges and in said recesses, means to exert an axial compression on said blocks greater than the shearing stress when the wheel is under the full load for which it was designed to thereby maintain said blocks in said shallow recesses and forming the sole means to hold said parts assembled, the periphery of said blocks having a circumferential concave surface therein of sufficient depth so that under all conditions of compression and load for which the wheel was designed said surface will retain its concave contour, and said rubber blocks being under an axial compression exceeding three times the shearing stress to which said blocks are subjected under the full load for which the wheel was designed.

6. A resilient wheel having a hub member and a rim member, two outer annular and radial flanges detachably secured to said hub member in axially spaced relation to each other, an intermediate annular and radial flange secured to said rim member and projecting inwardly between said outer flanges and spaced therefrom, said outer and intermediate flanges having a plurality of normally coaxial substantially shallow recesses in their facing sides, flexible rubber blocks disposed between said flanges and in said recesses, means to exert an axial compression on said blocks greater than the shearing stress when the wheel is under the full load for which it was designed to thereby maintain said blocks in said shallow recesses and forming the sole means to hold said parts assembled, the periphery of said blocks having a circumferential concave surface therein of sufficient depth so that under all conditions of compression and load for which the wheel was designed said surface will retain its concave contour, and said blocks having tapered end portions seating loosely in said recesses in the uncompressed state of the blocks and being firmly fixed therein by radial expansion when said blocks are axially compressed in assembling the wheel.

7. A resilient wheel having a hub member and a rim member, overlapping flanges on said members axially spaced from one another and having a plurality of normally coaxial substantially shallow recesses in their facing sides, flexible rubber blocks disposed between said flanges and in said recesses, means to exert an axial compression on said blocks greater than the shearing stress when the wheel is under the full load for which it was designed to thereby maintain said blocks in said shallow recesses and forming the sole means to hold said parts assembled, the periphery of said blocks having a circumferential concave surface therein of sufficient depth so that under all conditions of compression and load for which the wheel was designed said surface will retain its concave contour, and means for electrically flexibly connecting said overlapping flanges.

8. A resilient wheel as set forth in claim 2, in which the intermediate flange is electrically connected to one of the outer flanges by means of a flexible conductor having one of its ends attached to the inner side of said outer flange and passing through an aperture in the intermediate flange and having its other end detachably secured to the side of the intermediate flange facing the other outer flange, the latter being detachably secured in place by means of attaching bolts.

9. A resilient wheel having a hub member and a rim member, overlapping flanges on said members axially spaced from one another and having a plurality of normally coaxial substantially shallow recesses in their facing sides, flexible disc-shaped rubber blocks of circular cross section disposed between said flanges and having relatively short end portions disposed in said recesses, means to exert an axial compression on said blocks greater than the shearing stress when the wheel is under the full load for which it was designed to thereby maintain said blocks in said shallow recesses and forming the sole means to hold said parts assembled and the periphery of said blocks having a circumferential concave surface therein of sufficient depth so that under all conditions of compression and load for which the wheel was designed said surface will retain its concave contour.

NILS GUNNAR AUGUST MALMQUIST.